Patented July 3, 1945

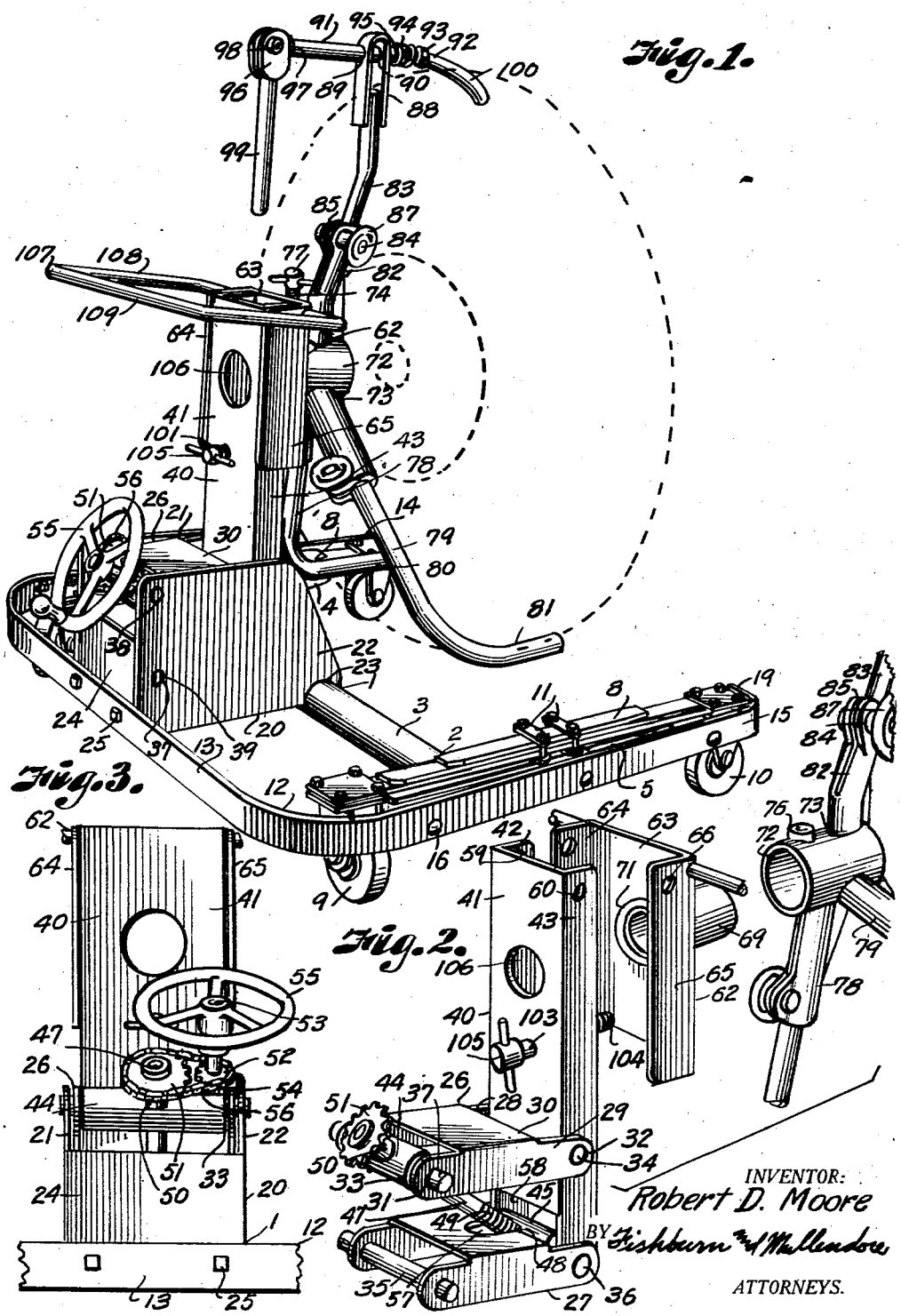

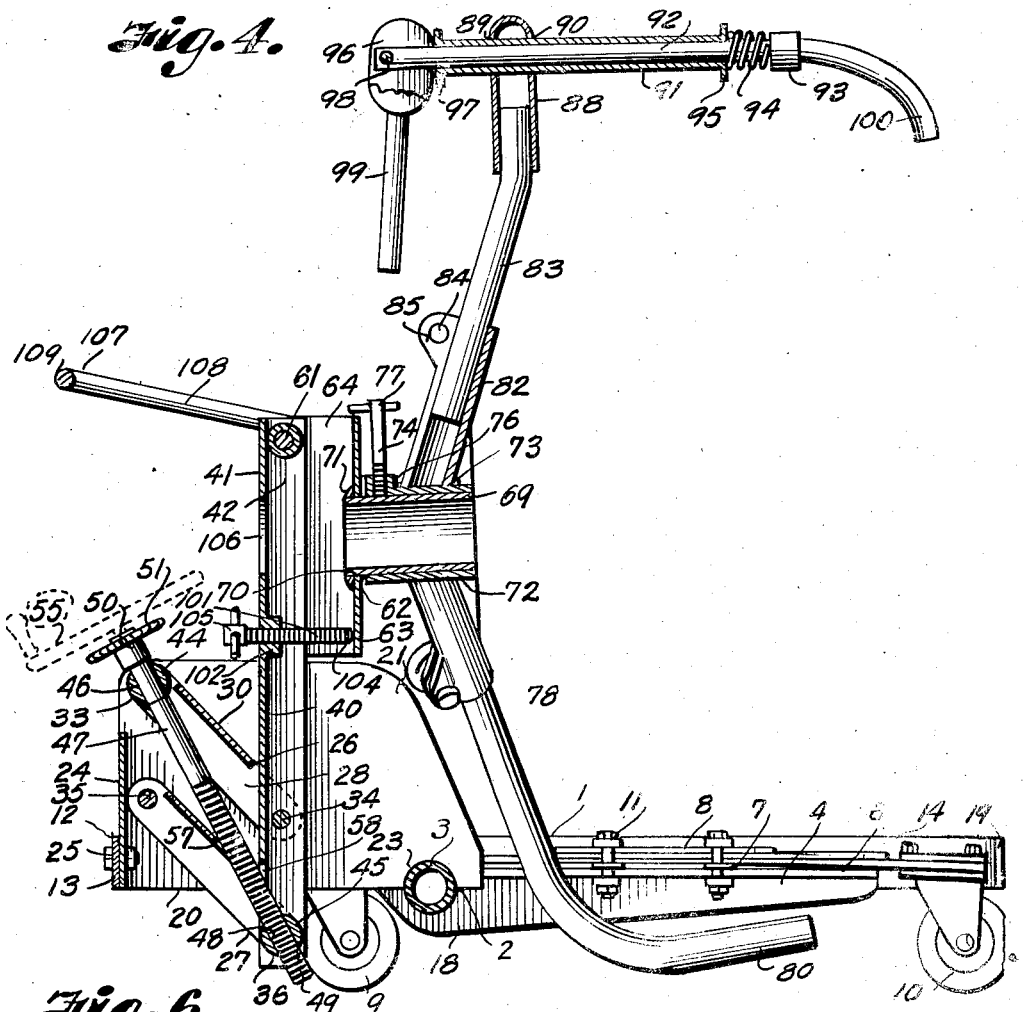
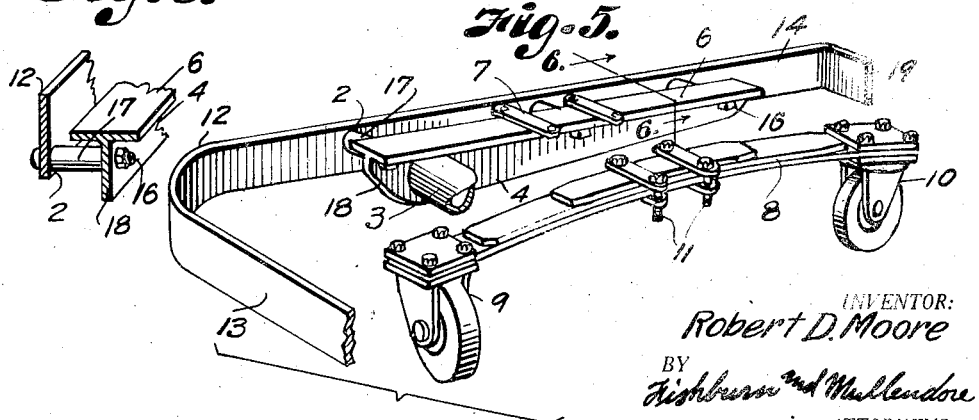

2,379,587

UNITED STATES PATENT OFFICE 2,379,587

WHEEL-MOUNTING DOLLY

Robert D. Moore, Kansas City, Mo.

Application April 20, 1944, Serial No. 531,897

19 Claims. (Cl. 214—65.4)

This invention relates to dollies particularly for carrying and mounting heavy parts, for example, the landing wheels of transport aircraft, trucks, and the like. Wheels of this character are frequently removed for inspection and repair purposes and because of their weight and bulk, they are difficult to handle and especially when the wheels are remounted.

It is, therefore, a principal object of the present invention to provide a dolly for facilitating mounting of such wheels.

Other objects of the invention are to provide a dolly that is readily adjusted to position and size of a wheel; to provide a wheel dolly with a readily operable mechanism for lifting a wheel for transport to the place of mounting; to provide a wheel dolly with means for aligning a wheel with the spindle or axle on which it is to be mounted; to provide a wheel dolly with a resilient carriage whereby a wheel may be readily joggled to facilitate its registry and movement onto its spindle or axle; and to provide a wheel dolly that is of simple, light-weight construction.

In accomplishing these and other objects of the invention as hereinafter pointed out, I have provided improved structure, the preferred forms of which are illustrated in the accompanying drawings, wherein:

Fig. 1 is a perspective view of a wheel dolly constructed in accordance with the present invention, a wheel being shown in carrying position on the dolly.

Fig. 2 is a detailed perspective view of parts of the dolly shown in disassembled spaced relation to better show the construction thereof.

Fig. 3 is a fragmentary elevational view of the rear side of the dolly particularly illustrating the mechanism for moving a wheel in a vertical plane.

Fig. 4 is a central longitudinal section through the dolly.

Fig. 5 is a perspective view of one side of the dolly, the resilient wheel-supporting assembly being removed and shown in spaced relation.

Fig. 6 is a cross section through the side of the carriage on the line 6—6 of Fig. 5.

Referring more in detail to the drawings:

1 designates a dolly constructed in accordance with the present invention and adapted to transport and mount heavy wheels on their spindles or axles, particularly aircraft wheels, truck wheels, and the like.

The dolly includes a carriage frame 2 comprising a transverse member 3 having arms 4 and 5 fixed to the end thereof as by welding or the like and having forwardly extending portions 6 carrying spring seats 7 about midway of their length as best shown in Fig. 5. Mounted on the spring seats 7 in upwardly spaced relation with the arms 4 and 5 are leaf springs 8 carrying caster wheels 9 and 10 at the outer ends thereof whereby the frame may be readily moved and resiliently supported upon the floor for transporting and positioning wheels as later described. Before application, the springs are arched so that when they are mounted on the arms 4 and 5 the ends of the spring bear upon the ends of the arms. Then the central portions are drawn into contact with the seats 7 by spring clamps 11. The springs are preloaded, and downward movement of spring ends is limited by the ends of the arms against which they bear. The load carried by the frame causes the end of the springs to flex upwardly and leave contact with the arms so that the frame may be joggled to facilitate mounting of a wheel as later described.

The frame also includes a bumper guard 12 having a transverse portion extending substantially parallel with the transverse member 3 and side portions 14 and 15 extending along the outer sides of the arms 4 and 5 which are attached thereto by fastening devices such as bolts 16 extending through the side portions, through sleeves 17, and through depending flanges 18 of the arms as best shown in Figs. 5 and 6 whereby the side portions provide protection for the springs, the forward ends 19 of the side portions being preferably turned inwardly to protect the forward casters 10, but the spacing therebetween is sufficient to permit the arms of the frame to pass the sides of a largest sized wheel for which the dolly is constructed.

Mounted on the frame substantially midway of the member 3 and extending rearwardly to the transverse portion 13 of the bumper guard is a toggle housing 20 including vertically-arranged side plates 21 and 22 having their forward ends welded as at 23 to the transverse member 3 and their rear ends connected by a transverse plate 24 which is secured to the transverse portion 13 of the bumper guard by fastening devices such as bolts 25. Pivotally mounted between the side plates are toggle 26 and 27, each including a substantially channel-shaped member having spaced side arms 28 and 29 connected by a cross web 30. The ends of the arms 28 and 29 project from the webs 30 and are provided with suitable openings 31 and 32 to mount transverse shafts 33 and 34 for the toggle 26, and 35 and 36 for the toggle 27. The shafts 33 and 35 have projecting ends to provide trunnions 37 which are pivotally mounted in pairs of bearing openings 38 and 39 formed in the side plates 21 and 22 in vertical alignment near the rear edges thereof as best shown in Fig. 1.

The forward ends of the arms carry therebetween a substantially channel-shaped vertical post 40 which has a transverse web 41 and forwardly extending side flanges 42 and 43, the side flanges being supplied with suitable openings for passing the ends of the shafts 34 and 36 as shown in Fig. 2, the spacing between the shafts 34 and 36 being substantially equal to the spacing between the shafts 33 and 35 so that when the toggles are operated the post 40 is kept in perpendicular alignment and adapted to be raised and lowered for raising and lowering a wheel as later described.

In order to actuate the toggles the shafts 33 and 36 are provided with enlarged portions 44 and 45 respectively. Formed in the enlarged portion 44 is a bearing opening 46 for passing the upper end of an actuating shaft 47. The enlarged portion 45 of the shaft 36 has an internally threaded opening 48 for passing the threaded end 49 of the actuating shaft. Fixed to the upper end of the shaft and engaging the enlarged portion of the transverse shaft 33 is a collar 50 mounting a sprocket wheel 51 whereby the shaft may be rotated to turn the threaded end thereof through the threaded opening of the enlarged portion of the shaft 36 so that when the shaft is rotated in one direction the post is raised by its supporting toggles and when the shaft is rotated in the opposite direction the post is lowered.

Cooperating with the sprocket 51 is a smaller sprocket 52 that is fixed to the stub shaft 53 journalled in a jacket 54 projecting from the side plate 22, and carried on the upper end of the stub shaft is a hand wheel 55 whereby the stub shaft may be rotated. Operating over the respective sprockets is a chain 56. With this arrangement a leverage is provided for rotating the shaft 47 and the vertical post may be adjusted in relatively close increments. It is thus obvious that the actuating shaft 47 provides an adjustable tie between the rear end of the upper toggle and the forward end of the lower toggle so that the vertical post is supported in any adjusted vertical position within the limit of the movement of the toggles.

In order to accommodate the actuating shaft 47 the web of the lower toggle is notched as at 57 and the web 41 of the vertical post 40 is cut away at the lower end as shown at 58. Mounted on the upper end of the post with the ends thereof engaging in suitable bearing openings 59 and 60 of the flanges 42 and 43 is a transverse shaft 61 having the ends projecting outwardly from the flanges to mount a wheel-carrying bracket 62. The bracket 62 includes a channel-shaped member having a web 63 and side flanges 64 and 65 adapted to overlap the outer sides of the flanges 42 and 43. The flanges 64 and 65 have openings 66 for passing the rod 61 mounting a spacing sleeve 68 between the flanges 42 and 43 (see Fig. 4), so that the bracket depends from the rod. Mounted on the bracket is a trunnion 69 comprising a tube having its rear end extending through an opening 70 in the web 63 and which is welded thereto as indicated at 71, Fig. 4. The outer end of the tube thus provides a spindle for mounting a sleeve-like hub 72 of a wheel-engaging clamp 73. The hub 72 is adapted to be clamped in a selected position on the spindle by a screw 74 threaded in a boss 76 on the hub 73 and it has the end thereof adapted to engage against the spindle. The outer end of the screw carries a head 77 by which the screw may be rotated into and out of clamping engagement with the spindle.

Fixed to the hub and diverging outwardly and downwardly therefrom are arms 78 and 79 terminating in forwardly extending wheel-seating portions 80 and 81 as best shown in Figs. 1 and 2. Fixed to the opposite side of the hub and extending upwardly and forwardly at a slight angle is a clamp-carrying arm 83. All of the arms are preferably supported in split sockets 82 so that they are adjustable for accommodating different sized wheels, the arms being retained in the sockets by clamp screws 84 extending through ears 85 on the respective sides of the split portions of the sockets, and are provided with suitable hand wheels 87 by which they may be readily moved into and out of clamping position.

Carried on the upper end of the arm 83 is an inverted U-shaped bracket 88 having registering openings 89 and 90 for slidably mounting a tube 91 extending substantially parallel with the forwardly extending portions 80 and 81 of the lower arms, the tube 91 being of a size relative to the size of the openings 89 and 90 so that slight lateral pressure thereon will cause the tube to bind or grip in the opening and be retained from reciprocation therethrough.

Slidably and rotatably mounted within the tube 91 is a rod 92 having a collar 93 on the forward end thereof engaged by a spring 94 which has the rear end thereof engaged against a flange 95 on the end of the tube 91 whereby the rod is urged in a forward direction to retain a cam-like clamping head 96 against a similar flange 97 on the rear end of the tube. The cam-shaped head 96 is pivotally mounted on the rear end of the rod by a pivot pin 98 and is adapted to be rocked to draw the rod retractively against action of the spring by a handle lever 99. The forward end of the rod is curved downwardly as at 100 so as to cooperate with the forward extending portions of the forward arms to clamp a wheel therebetween as later described.

In order to pivot the channel-shaped bracket on the post, the web 41 of the post carries a screw 101. The web of the vertical post 40 has a forwardly extending boss 102 for threadingly mounting the adjusting screw 101 arranged so that the forward end 104 thereof engages the lower portion of the web 63 of the bracket as shown in Fig. 4. The rear end of the screw has an operating handle or head 105 by which it may be readily rotated to change the angle of the inclination of the wheel-carrying arms. Also formed in the web 41 and registering with the axis of the tube-like spindle is a sight opening 106 through which the position of the hub of a wheel may be sighted into alignment with a spindle or axle on which it is to be mounted.

To facilitate movement of the dolly, the channel-shaped bracket may be provided with a handle 107 having side bar portions 108 welded or otherwise attached to the bracket at their forward ends and which are connected at their rear ends with a corresponding bar portion 109 as shown in Fig. 1.

In using a dolly constructed and assembled as described for removing a wheel, the dolly is trundled up to the wheel with the arms 4 and 5 of the frame in position to pass the sides of the wheel. The wheel-engaging arms 78, 79, and 83 are then adjusted so that the ends 80 and 81 and the curved end 100 of the clamp mechanism will pass over the tread of the wheel. The curved end of the clamp is turned upwardly by rotating the rod 92 within the tube 91 by aid of the lever 99. The hand wheel 51 is then rotated in a direction for centering the tubular spindle 69 coaxially with the wheel hub as viewed through the sight opening 106. The entire dolly is then moved in the direction of the wheel so that the supporting terminals 80 and 81 of the arms 78 and 79 pass under sides of the wheel and the curved terminal of the clamping mechanism over the top of the wheel, the screw 101 having been adjusted to angularly position the axis of the arm-carrying spindle with the axis of the wheel. The arms are then raised to bring the ends 80 and 81 into supporting engagement with the underside of the wheel after which the rod 92 is rotated to bring the curved end into position to engage the wheel when the tube 91 is drawn retractively through the openings of the bracket 88. As soon as the curved end engages the wheel there is sufficient lateral pressure on the tube 91 to lock it against action of the spring within the openings 89 and 90 of the U-shaped bracket 80. The curved end 100 is then drawn into clamping engagement with the wheel by operation of the cam 96 which draws the rod 92 through the tube 91 against action of the spring 94, after which the hand wheel 55 is actuated so that the arms take the load of the wheel. The wheel, having been loosened from its axle, is then readily removed by moving the dolly away from the axle on which the wheel is mounted. The wheel may then be conveyed on the dolly to a place for repair or the like where the wheel may be lowered for support on the floor by lowering the post 40 until the lower portion of the wheel contacts the floor. The clamping rod is then released and the curved end turned upwardly after which the dolly is moved away from the wheel.

To re-engage the dolly with the wheel, the dolly is moved up to the wheel and the supporting and clamping arms of the dolly are adjusted for elevation with respect to the wheel by rotating the hand wheel 99. The wheel is then engaged by the clamp rod, lifted off the floor, and trundled to the axle on which it is to be mounted, the dolly being trundled so that the wheel is carried in the direction of the axle. The wheel may be adjusted vertically with respect to the axle through manipulation of the hand wheel 55 which raises or lowers the wheel and the axis of the wheel hub is aligned with the axis of the axle by tilting the wheel-carrying arms through manipulation of the screw 105.

If it is desired to rotate the wheel to align a keyway in the hub thereof with a spline on the axle, this is readily effected by loosening the screw 77 and rotating the wheel-supporting arms until the key and its way align. The dolly is then trundled toward the axles so as to carry the wheel thereover. During this movement the frame of the dolly may be joggled on the springs 8 to facilitate passage of the hub over the axle. When the wheel is in position the clamp 100 is released and the dolly moved away from the wheel so that the wheel may be tightened on the axle.

From the foregoing it is obvious that I have provided a wheel dolly which facilitates mounting of heavy wheels such as used on transport aircraft, trucks, and the like.

It is also obvious that the spring mounting of the dolly greatly facilitates mounting of the wheel since the entire wheel-carrying mechanism is joggled sufficiently to allow free entrance of the wheel hub upon its axle. Preloading of the springs also limits the movement thereof and is important as it is not necessary to take up full action of the springs when a wheel is being raised.

While I have particularly illustrated and described the wheel dolly as used in connection with removal and application of vehicle wheels, it is obvious that it may be used for other types of wheels without departing from the spirit of the invention.

What I claim and desire to secure by Letters Patent is:

1. A wheel-mounting dolly including a frame, a post-like member, toggle arms connecting the post-like member with the frame, means for actuating the toggle arms for raising and lowering the post-like member on the frame, a bracket tiltably supported on the post-like member, a spindle on the bracket, a hub-like member rotatably mounted on said spindle, a pair of downwardly diverging wheel-supporting arms on the hub-like member, and a clamping arm cooperating with the first-named arms and extending from the opposite direction on the hub-like member for clamping a wheel.

2. A wheel-mounting dolly including a frame, a post-like member, toggle arms connecting the post-like member with the frame, means for actuating the toggle arms for raising and lowering the post-like member on the frame, a bracket tiltably supported on the post-like member, a hollow spindle on the bracket, a hub-like member rotatably mounted on said spindle, a pair of downwardly diverging wheel-supporting arms on the hub-like member, a clamping arm cooperating with the first-named arms and extending from the opposite direction on the hub-like member for clamping a wheel, and stop means for selectively preventing rotation of the hub-like member on the spindle.

3. A wheel-carrying dolly including a frame, spring leaves on the frame, wheels attached to the spring leaves for supporting the frame, a wheel-carrying post, toggle arms mounting said post on the frame, a bracket member pivotally mounted on the post, a spindle on the bracket member, a hub rotatable on the spindle, a plurality of wheel-engaging arms on the hub, and means on the frame for actuating the toggle arms to lower the post to carry the wheel-engaging arms into position for engaging a wheel and for raising the post to support said wheel on the dolly frame.

4. A wheel-carrying dolly including a frame, spring leaves on the frame, wheels attached to the spring leaves for supporting the frame, a wheel-carrying post, toggle arms mounting said post on the frame, a bracket member pivotally mounted on the post, a spindle on the bracket member, a hub rotatable on the spindle, a plurality of wheel-engaging arms on the hub, means on the frame for actuating the toggle arms to lower the post to carry the wheel-engaging arms into position for engaging a wheel and for raising the post to support said wheel on the dolly frame, and means on the post for tilting the bracket to adjust the angular post of the wheel on the dolly-supporting frame.

5. A wheel-carrying dolly, a pair of wheel-supporting arms, a clamping arm cooperating with the wheel-supporting arms, a wheel-engaging clamp on the clamping arm including a tubular member having gripping support with said clamping arm, a rod slidable in the tubular member, a wheel-engaging terminal on the rod, a spring on the rod for urging the rod from wheel-engaging position, a cam pivotally mounted on the rod and engaging the tubular member for drawing the clamp into engagement with a wheel when the wheel is supported by said arms.

6. A wheel-carrying dolly, a pair of wheel-supporting arms, a clamping arm cooperating with the wheel-supporting arms, a wheel-engaging clamp on the clamping arm including a tubular member having gripping support with said clamping arms, a rod slidable in the tubular member, a wheel-engaging terminal on the rod, a spring on the rod for urging the rod from wheel-engaging position, and means between the rod and the tubular member for drawing the clamp into engagement with the wheel when the wheel is supported by said arms.

7. A wheel-mounting dolly including a frame, a post-like member having a sight opening therethrough, toggle arms for supporting the post-like member on the frame, means for actuating the toggle arms for raising and lowering the post-like member on the frame, a bracket tiltably supported on the post-like member, a hollow spindle on the bracket registering with the sight opening, a hub-like member rotatably mounted on said spindle, a pair of downwardly diverging wheel-supporting arms on the hub-like member, a clamping arm cooperating with the first-named arms and extending from the opposite direction on the hub-like member for clamping a wheel, and stop means for selectively preventing rotation of the hub-like member on the spindle.

8. A wheel-mounting dolly including a frame, a post-like member having a sight opening therethrough, toggle arms for supporting the post-like member on the frame, means for actuating the toggle arms for raising and lowering the post-like members on the frame, a bracket tiltably supported on the post-like member, a hollow spindle on the bracket registering with the sight opening, a hub-like member rotatably mounted on said spindle, a pair of downwardly diverging wheel-supporting arms on the hub-like member, a clamping arm cooperating with the first-named arms and extending from the opposite direction on the hub-like member for clamping a wheel, stop means for selectively preventing rotation of the hub-like member on the spindle, and wheel means for resiliently mounting the frame for rolling support thereof.

9. A wheel-mounting dolly including a frame, article-supporting means on the frame, normally arch shaped leaf springs, means for anchoring mid portions of said springs to the frame, wheels on the ends of said springs for supporting the frame, and means on the frame and contacted by ends of the springs for effecting pre-loading said springs when the mid portions of the springs are secured by said anchoring means.

10. A wheel-mounting dolly including a frame, article-supporting means on the frame, normally arch shaped leaf springs, means for anchoring mid portions of said springs to the frame, wheels on the ends of said springs for supporting the frame, means on the frame and contacted by ends of the springs for effecting pre-loading said springs when the mid portions of the springs are secured by said anchoring means, and means for raising and lowering the article-supporting means on the frame.

11. A wheel-carrying dolly including a frame, a wheel-carrying member on the frame including a substantially horizontal spindle, a hub-like member rotatable on the spindle and having radially projecting sockets, arms adjustably supported in the sockets, wheel-engaging means on the ends of the arms for carrying a wheel on said dolly and adapted to be rotated on said horizontal spindle for facilitating registry of a keyway in the hub of said wheel with a keyway in an axle on which the wheel is to be mounted.

12. A wheel-carrying dolly including a frame, a wheel-carrying member on the frame including a substantially horizontal spindle, a hub-like member rotatable on the spindle and having radially projecting sockets, arms adjustably supported in the sockets, and wheel-engaging means on the ends of the arms for carrying a wheel on said dolly and adapted to be rotated on said horizontal spindle for facilitating registry of a keyway in the hub of said wheel with the keyway in an axle on which the wheel is to be mounted, one of said wheel-engaging means being adjustably movable on its supporting arm to provide a clamping action.

13. In a wheel-carrying dolly, a wheel-engaging clamp including supporting means for one side of a wheel, a tubular member opposed to the wheel supporting means, means slidably supporting the tubular member, a rod rotatably slidable in the tubular member, wheel-engaging means on one end of the rod for cooperating with the supporting means to engage a wheel therebetween, a spring on said rod and having one end engaging the tubular member to urge the rod in one direction, and cam means pivotally connected with the other end of the rod and engaging the tubular member to move the rod in the opposite direction.

14. In a wheel-carrying dolly, wheel supporting means, a supporting arm opposed to the wheel supporting means, a bracket carried by the supporting arm having an opening, a tubular member slidable through said opening and adapted to be gripped in said opening, a clamping member cooperating with the wheel supporting means for engaging a wheel therebetween and slidable and rotatable in one direction, and cam means on the clamping member and engageable with the tubular member to move the clamping member in the opposite direction.

15. A dolly for registering an apertured article with its mounting member including a frame, mobile means supporting the frame, means for supporting said article having an axial sight opening therethrough adapted for registry with the aperture in said article when supported by said means, and means for raising and lowering said supporting means on the frame to elevate the article relative to its mounting member as viewed through said sight opening.

16. A dolly for registering an apertured article with its mounting member including a frame, mobile means supporting the frame, means for supporting said article having an axial sight opening therethrough adapted for registry with the aperture in said article when supported by said means, means for raising and lowering said supporting means on the frame to elevate the article relative to its mounting member as viewed through said sight opening, and means for rotating the article supporting means on said raising and lowering means.

17. A dolly for registering an apertured article with its mounting member including a frame, mobile means supporting the frame, means for supporting said article having an axial sight opening therethrough adapted for registry with the aperture in said article when supported by said means, means for raising and lowering said supporting means on the frame to elevate the article relative to its mounting member as viewed through said sight opening, means for rotating the article supporting means on said raising and lowering means, and means for tilting the article supporting means on said raising and lowering means.

18. A wheel carrying dolly including a moble frame, a support vertically adjustable on said frame and having a sight opening therethrough, a tubular spindle, means tiltably mounting the tubular spindle on the support in substantial registry with the sight opening, a hub rotatably mounted on the spindle, and radial arms on said hub having wheel engaging terminals for supporting the axis of a wheel in registry with the sight opening and the axis of the tubular spindle.

19. A wheel carrying dolly including a frame, a tubular spindle, a hub rotatably mounted on the spindle, radially extending arms on the hub having wheel engaging terminals for supporting a wheel with the axis thereof in substantial registry with the axis of the tubular spindle, and means for supporting the tubular spindle on the frame including means for raising and lowering said spindle and for tilting said spindle.

ROBERT D. MOORE.